Figure 2:
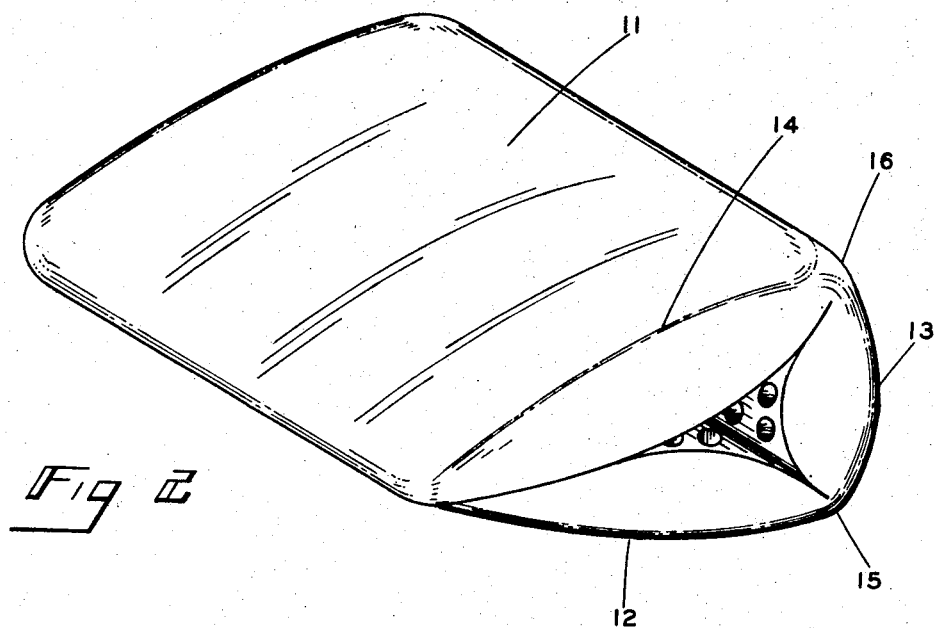

March 17, 1959 — W. T. WAGNER — 2,877,472
TRIANGULAR PILLOW
Filed Oct. 31, 1956

WILLIAM T. WAGNER
INVENTOR.

BY
Reuben Wolk
ATTORNEY

United States Patent Office 2,877,472
Patented Mar. 17, 1959

2,877,472

TRIANGULAR PILLOW

William T. Wagner, Dayton, Ohio, assignor to The Dayton Rubber Company, Dayton, Ohio, a corporation of Ohio Application October 31, 1956, Serial No. 619,417

8 Claims. (Cl. 5—337)

This invention relates to pillows, and more particularly to an improved pillow construction formed of a cellular elastomeric material such as foam rubber or foamed polyurethane, and possessing the advantages inherent in such materials.

Foam rubber has been previously employed in molding pillow sections, but these molded sections have generally been of block type configuration, resulting in limited resilience, strength, adaptability, and wear resistance.

A primary object of the present invention is to provide an improved pillow construction employing cored cellular elastomeric material to economically form a pillow unit having improved strength, resilience, adaptability, and wear characteristics.

The subject invention is the result of efforts to produce a lightweight and inexpensive pillow which would adapt to a wide variety of applications. In general it has been found that cellular elastomeric materials basically are highly desirable for manufacturing products providing bodily comfort. Foam rubber and foamed polyurethane have low density characteristics that are extremely useful, and have particularly desirable bodily comfort characteristics due to their natural resiliency and superior strength. Their production in molded form is a simple procedure and results in an inexpensive product. The preferred embodiment of the present invention is provided by molding a relatively thin sheet of cored material to form a planar surface on its cored side while providing the opposite surface with an undulating contour resulting in longitudinally spaced convex sections separated by substantial recesses. The sheet is thus formed to have very thin sections intermediate the successive convex portions, thus enabling the portions to be folded over to provide a pillow having a cross section in the form of a triangle, preferably a right triangle.

An object of the invention is to provide an improved pillow having maximum bodily comfort employing a minimum of material.

A further object of the invention is to provide an improved folded pillow construction of cored cellular elastomeric material having a right triangular configuration which is readily adaptable to meet a variety of needs and applications.

An additional object of the invention is to provide a molded sheet of cellular elastomeric material formed with a planar and an opposed undulating surface so that in joining the ends a pillow of right triangular configuration will result.

A further object of the invention is to provide an improved pillow construction made from a molded sheet of cellular elastomeric material which may be folded to provide a configuration which will readily adapt to any weight applied and will return to its original configuration upon release of such weight.

Another object of the invention is to provide a pillow possessing the advantageous structural features, the inherent meritorious characteristics, and the mode of operation herein described.

With these and other objects in view, the invention intended to be covered by Letters Patent consists of the features of construction, the parts and combinations thereof, and the mode of operation as hereinafter described or illustrated in the accompanying drawings, or their equivalents.

Figure 1:
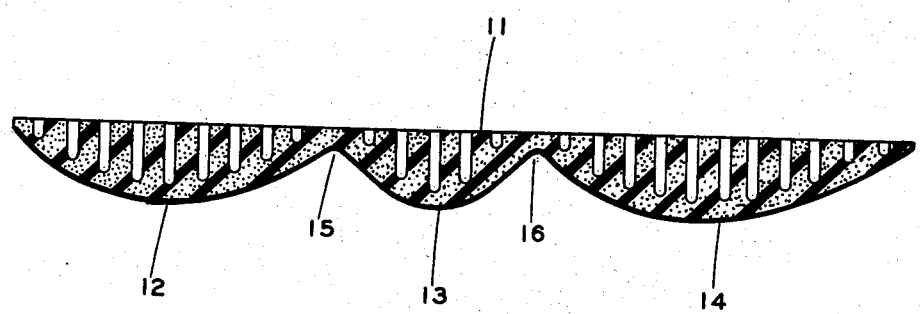

Referring to the drawings, wherein is illustrated the preferred, but obviously not necessarily the only form of embodiment of the invention:

Figure 1 of the drawings illustrates the molded strip employed in effecting the subject invention; and Figure 2 is a general perspective view of the strip of Figure 1 folded into the improved pillow in accordance with the invention.

The invention can be best described with reference to the drawings. In making the pillow of the invention, a rectangular sheet of cellular elastomeric material such as foamed polyurethane or foam rubber is molded as shown in Figure 1 of the drawings and is designated as member 11. One surface of the sheet is flat, and is cored at intervals, while the opposite face of the foam rubber strip is formed to have an undulating character and is provided with three longitudinally spaced convex portions or sections 12, 13 and 14, respectively, separated by concavities 15 and 16. The convex section 14 at one end of this sheet has a smoothly curving or arcuate outer surface.

The convex section 12 at the other end of the sheet is similar but slightly shorter in span, while the intermediate convex section 13 is relatively short in span but has substantially the same depth as the other convex sections. The thickness of the sheet at the concavities 15 and 16 is considerably reduced to provide what amounts to hinge sections in the sheet transversely thereof.

The sheet is removed from the mold and subjected to various conventional finishing processes such as washing and drying, which will not be further discussed as they form no part of this invention. The sheet is then folded about the concavities or hinge sections 15 and 16 in the direction of the flat surfaces so that the end section 12 serves as the base or longer leg of the right triangle as shown in Figure 2. The intermediate section 13 forms the short leg of the triangle and is, therefore, at right angles to section 12. The longest section 14 forms the hypotenuse of the triangle to complete the pillow. Due to the folding action, the convex sections will now lie on the exterior of the pillow and because of the internal pressures and strains created by contact of these sections, the outer surface will be slightly flattened but still arcuate. At the same time, the flat surfaces corresponding to the sections 12, 13 and 14 will be disposed at the interior of the pillow. During the folding action, the extremities of each interior portion are forced into a rolling and resilient contacting support with the extremities of the adjacent interior portions, thereby forcing the remainder of the interior portion to assume an arcuate configuration. These contacting extremities provide a mutual support and resilience that sets up a permanent internal stress and tends to maintain the arcuate configuration of the internal and external surfaces.

In order to maintain the triangular shape of the finished pillow, the extremities of the original sheet; that is, the free ends of sections 12 and 14, may be secured by means of a suitable adhesive at their contacting portions which form the intersection of the hypotenuse and the base. The pillow may, if desired, be finished off by pulling a casing or cover over it.

It can thus be seen that by means of this invention, the sheet 11 is used to construct a pillow having a section of right triangular configuration wherein the legs of the triangle are formed of strip sections of cored foam material having convex surface portions at one face which, when folded, project outwardly, while the opposite faces project inwardly in order to define a generally triangular aperture intermediate the inner surfaces. This construction provides a resilient lightweight pillow having considerable strength. There is substantial resiliency provided by this cellular elastomeric material so that the right angular configuration may serve the pillow for use as a back rest or headrest or other similar applications. Upon application of weight to the pillow unit the material will give in a comforting manner and adapt itself readily to the contour of the body applied thereto. The triangular aperture intermediate the sections of the strip forming the triangular configuration creates an additional cushioning effect within the pillow to give it even greater flexibility and cushioning comfort than the resilient foam construction provides in itself. This is due to the flexure created by the reaction of each member upon the other.

It will be noted that the particular configuration of the pillow unit provides inner arcuate sections relatively rolling as load is applied thereto. An extreme cushioning capacity of a continuous nature is thus provided which is at once shock absorbing and adaptable to meet the needs and requirements to which the pillow is applied. The particular rolling relation of the sections provided by the right triangular folding of the pillow strip is of noteworthy importance for it incorporates a greater wear resistance in the pillow since the curved surfaces in rolling against each other absorb wear and shock applied to the outer surfaces. The pillow unit is thus provided with longer life. As may be readily seen, an economical pillow of highly advantageous construction derives.

From the above description it will be apparent that there is thus provided a device of the character described possessing the particular features of advantage before enumerated as desirable, but which is obviously susceptible of modification in its form, proportions, detail construction and arrangement of parts without departing from the principle involved or sacrificing any of its advantages. More specifically, the relationship of the sides of the triangle may be varied to fit specific design requirements. Thus, if a higher back surface is desired, the vertical side may be the longest. It is also possible that an equilateral triangular cross section may be preferred for certain applications.

While in order to comply with the statute the invention has been described in language more or less specific as to structural features, it is to be understood that the invention is not limited to the specific features shown, but that the means and construction herein disclosed comprises but one of the several modes of putting the invention into effect.

Having thus described my invention, I claim:

1. A pillow element comprising a section of a cellular elastomeric material having a substantially flat surface on one face thereof, the other face of said section being undulated, said section comprising a plurality of hinge sections at spaced locations therein, said hinge sections having a thinner cross section than the rest of said section, said section being hinged about said hinge sections to dispose the undulating surface externally to provide a pillow unit having internal surfaces in relatively rolling relation on application of load thereto.

2. A pillow element comprising sections of resilient cushioning material having a flat surface on one side and a convex surface on the other side thereof, hinge means interconnecting said sections, said sections being folded to dispose their convex surfaces externally in relatively rolling relation to provide a generally triangular pillow unit having considerable load adaptability and bodily comfort characteristics.

3. A pillow element comprising a section of cellular elastomeric material, said section having convex portions on one surface separated by concavities therein, said concavities defining limited thickness of said section at the points thereof to provide hinge means, said section folded at said hinge means to form a unitary pillow structure having internally abutting convex surfaces in rolling relation upon application of load.

4. A pillow element comprising a low density section of resilient material, said section having spaced portions with arcuate projections on one surface thereof, said section being folded to dispose the portions in triangular relation to form a pillow element including a central air cushion defined by said portions.

5. A pillow element comprising a section of cored cellular elastomeric material, said section having convex portions extending from one surface and separated by concavities on said surface, said concavities defining lesser thicknesses than the remainder of said section, said section folded at said concavities to form a pillow unit of right triangular configuration having the internal surfaces defining a generally triangular aperture therethrough forming an air pocket.

6. A cellular elastomeric strip for providing a pillow unit of generally triangular configuration comprising a rectangular section having a flat surface on one face thereof, said one face being cored, the other face of said section being formed with spaced arcuate projections thereon, said section folded to dispose at least a portion of said projections in an externally disposed relation, the flat surfaces thereby becoming curved and having a rolling relationship on application of a load thereto.

7. A pillow of generally triangular cross section comprising a plurality of portions forming the legs of said triangle, each portion having a smooth arcuate outer surface and a cored arcuate inner surface, each extremity of the inner surface of each portion mating with an extremity of the inner surface of its adjacent portion to provide a rolling and resilient support when undergoing loads, said inner surfaces defining a generally triangular aperture in said pillow.

8. A pillow of generally triangular cross section comprising a plurality of portions forming the legs of said triangle, each portion having a smooth arcuate outer surface and a cored arcuate inner surface, each of said portions having a permanent internal stress tending to maintain said surfaces in their arcuate configuration.

References Cited in the file of this patent

UNITED STATES PATENTS

| | | |
|---|---|---|
| 1,385,355 | Banks | July 26, 1921 |
| 2,562,725 | Leto et al. | July 31, 1951 |
| 2,659,418 | Berman | Nov. 17, 1953 |

FOREIGN PATENTS

| | | |
|---|---|---|
| 190,028 | Switzerland | Nov. 1, 1937 |